US010190667B2

(12) United States Patent
Onitake et al.

(10) Patent No.: US 10,190,667 B2
(45) Date of Patent: Jan. 29, 2019

(54) POWER TRANSMISSION INTERRUPTING DEVICE AND LIMITED-SLIP DIFFERENTIAL

(71) Applicant: JTEKT CORPORATION, Osaka-shi (JP)

(72) Inventors: Minoru Onitake, Kariya (JP); Yasunori Kamitani, Fujimi (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/444,677

(22) Filed: Feb. 28, 2017

(65) Prior Publication Data

US 2017/0254400 A1   Sep. 7, 2017

(30) Foreign Application Priority Data

Mar. 2, 2016  (JP) .................................. 2016-039990
May 6, 2016  (JP) .................................. 2016-093380

(51) Int. Cl.
| | | |
|---|---|---|
| *F16H 48/24* | (2006.01) | |
| *F16H 48/10* | (2012.01) | |
| *F16H 48/34* | (2012.01) | |
| *F16D 27/09* | (2006.01) | |

(Continued)

(52) U.S. Cl.
CPC ............. *F16H 48/24* (2013.01); *F16D 27/09* (2013.01); *F16H 48/10* (2013.01); *F16H 48/34* (2013.01); *F16D 11/14* (2013.01); *F16D 2023/123* (2013.01); *F16D 2300/18* (2013.01)

(58) Field of Classification Search
None
See application file for complete search history.

(56) References Cited

U.S. PATENT DOCUMENTS 5,052,534 A * 10/1991 Gustin .................... F16D 23/04
                                                    192/53.2
6,945,895 B2 * 9/2005 Fusegi ................... B60K 23/04
                                                    180/247

(Continued)

FOREIGN PATENT DOCUMENTS

JP        2010-84930 A      4/2010
JP        WO2015056330   *  4/2015    ............. F16D 27/10

*Primary Examiner* — Robert W Hodge
*Assistant Examiner* — Ryan P Dodd
(74) *Attorney, Agent, or Firm* — Oblon, McClelland, Maier & Neustadt, L.L.P.

(57) ABSTRACT

A power transmission interrupting device includes: an interrupting member that is restrained from rotating relative to the first rotating member, has engaging teeth engaging with a second rotating member, and is movable in an axial direction between a coupling position at which the engaging teeth engage with the second rotating member and an uncoupling position at which the engaging teeth do not engage with the second rotating member; and a moving mechanism that moves the interrupting member in the axial direction. The moving mechanism has an annular electromagnet, a yoke, and a moving member. The moving member has a cylindrical part facing an inner circumferential surface or an outer circumferential surface of the electromagnet, and an annular cover extending from one end of the cylindrical part in a radial direction and covering one of axial end faces of the electromagnet.

13 Claims, 9 Drawing Sheets

(51) Int. Cl.
  *F16D 11/14* (2006.01)
  *F16D 23/12* (2006.01)

(56) References Cited

U.S. PATENT DOCUMENTS

| | | | | |
|---|---|---|---|---|
| 9,033,843 | B2* | 5/2015 | Knoblauch | F16D 11/14 |
| | | | | 475/231 |
| 9,458,892 | B2* | 10/2016 | Fujii | F16D 11/14 |
| 9,835,209 | B2* | 12/2017 | Onitake | F16D 48/064 |
| 9,897,187 | B2* | 2/2018 | Onitake | F16H 48/34 |
| 2005/0187063 | A1* | 8/2005 | Haruki | F16H 48/08 |
| | | | | 475/231 |
| 2010/0056314 | A1* | 3/2010 | Maruyama | F16H 48/08 |
| | | | | 475/150 |
| 2016/0223064 | A1* | 8/2016 | Yamanaka | F16H 48/34 |
| 2017/0254399 | A1* | 9/2017 | Onitake | F16H 48/24 |

* cited by examiner

POWER TRANSMISSION INTERRUPTING DEVICE AND LIMITED-SLIP DIFFERENTIAL

INCORPORATION BY REFERENCE

The disclosure of Japanese Patent Application No. 2016-039990 filed on Mar. 2, 2016 and 2016-093380 filed on May 6, 2016, each including the specification, drawings and abstract is incorporated herein by reference in its entirety.

BACKGROUND

1. Technical Field

The present disclosure relates to a power transmission interrupting device and a limited-slip differential.

2. Description of Related Art

Among differential gears that allocate power to the left and right wheels of a vehicle allowing for differential motion thereof, some are equipped with a positive clutch for limiting the differential motion of rotating members that are rotatable relative to each other (e.g., see Japanese Patent Application Publication No. 2010-84930).

The differential gear described in JP 2010-84930 A has a differential case, a pair of pinion gears rotatably supported on a pinion shaft that rotates integrally with the differential case, a pair of side gears meshing with the pair of pinion gears with the gear axes orthogonally crossed, an interrupting member disposed so as to be movable in the axial direction while engaged in a hole formed in the differential case in a rotation direction, and an actuator that moves the interrupting member in the axial direction.

The interrupting member has engaging teeth engaging with one side gear of the pair of side gears, and rotates with the differential case. The actuator has an electromagnet, a movable member that moves in the axial direction under a magnetic force of the electromagnet, and a position switch that detects the engaging state of the interrupting member. The electromagnet is composed of a magnet coil and a core disposed so as to surround the magnet coil. The movable member is composed of a plunger formed by a soft magnetic body, and a ring formed by a non-magnetic body that prevents magnetic flux of the electromagnet from leaking to the differential case. The movable member is disposed inside the electromagnet, and the electromagnet and the interrupting member are disposed side by side in the axial direction.

When current is applied to the magnet coil, the plunger moves toward the interrupting member, causing the ring to press the interrupting member through a plate fixed to the interrupting member. Under this pressing force, the interrupting member moves in the axial direction and engages with the one side gear. Thus, relative rotation of the differential case and the one side gear is restrained, and differential rotation of the pair of side gears is also restrained accordingly.

SUMMARY

In the differential gear of JP 2010-84930 A, the core denoted by reference sign 79 in FIG. 1 of the disclosure is formed in a substantially quadrangular shape in cross-section so as to surround the magnet coil, and the part of the core facing a part of the inner circumferential surface of the magnet coil is discontinuous. The plunger is disposed with one axial end facing this discontinuous part, and constitutes part of the magnetic flux generated as current is applied to the magnetic coil.

A core with such a shape is difficult to form by a single member. It is therefore necessary, for example, as shown in FIG. 1 of JP 2010-84930 A, to combine three members by welding etc.: one member covering one axial side surface and a part of the inner circumferential surface of the magnet coil, another member covering the other axial side surface of the magnet coil, and the other member covering the outer circumferential surface of the magnet coil. However, this makes the structure and the manufacturing process of the core complicated, causing an increase in manufacturing cost.

Therefore, an object of the present disclosure is to provide a power transmission interrupting device and a limited-slip differential in which the configuration of a moving mechanism for moving an interrupting member that couples and uncouples two rotating members rotatable relative to each other can be simplified, and of which the manufacturing cost can be thereby reduced.

A power transmission interrupting device according to a first aspect of the present disclosure is configured to interrupt power transmission between a first rotating member and a second rotating member that are rotatable relative to each other on the same rotational axis, and includes: an interrupting member that is restrained from rotating relative to the first rotating member, has engaging teeth engaging with the second rotating member, and is movable in an axial direction between a coupling position at which the engaging teeth engage with the second rotating member and an uncoupling position at which the engaging teeth do not engage with the second rotating member; and a moving mechanism that moves the interrupting member in the axial direction. The moving mechanism has: an annular electromagnet including a coil winding that generates magnetic flux when current is applied thereto; a yoke constituting part of a magnetic path of the magnetic flux; and a moving member, formed by a soft magnetic body, that constitutes the magnetic path of the magnetic flux with the yoke and moves in the axial direction with the interrupting member. The moving member has a cylindrical part facing an inner circumferential surface or an outer circumferential surface of the electromagnet, and an annular cover extending from one end of the cylindrical part in a radial direction and covering one of axial end faces of the electromagnet. When current is applied to the coil winding, the interrupting member moves in the axial direction as the moving member moves so that the interval between the annular cover and the one axial end face of the electromagnet changes.

A limited-slip differential according to a second aspect of the present disclosure includes: a first rotating member; a second rotating member disposed so as to be rotatable relative to the first rotating member around a common rotational axis; a third rotating member disposed so as to be rotatable relative to the first rotating member and the second rotating member around the common rotational axis; an interrupting member that is restrained from rotating relative to the first rotating member, has engaging teeth engaging with the second rotating member, and is movable in an axial direction between a coupling position at which the engaging teeth engage with the second rotating member and an uncoupling position at which the engaging teeth do not engage with the second rotating member; and a moving mechanism that moves the interrupting member in the axial direction. As the first rotating member and the second rotating member are restrained from rotating relative to each other by the interrupting member, the third rotating member and the first and second rotating members are also restrained from rotating relative to each other. The moving mechanism has: an annular electromagnet including a coil winding that generates magnetic flux when current is applied thereto; a yoke constituting part of a magnetic path of the magnetic flux; and a moving member, formed by a soft magnetic body, that constitutes the magnetic path of the magnetic flux with the yoke and moves in the axial direction with the interrupting member. The moving member has a cylindrical part facing an inner circumferential surface or an outer circumferential surface of the electromagnet, and an annular cover extending from one end of the cylindrical part in a radial direction and covering one of axial end faces of the electromagnet. When current is applied to the coil winding, the interrupting member moves in the axial direction as the moving member moves so that the interval between the annular cover and the one axial end face of the electromagnet changes.

According to the power transmission interrupting device and the limited-slip differential of the above aspects, it is possible to simplify the configuration of the moving mechanism for moving the interrupting member that couples and uncouples two rotating members rotatable relative to each other, and to thereby reduce the manufacturing cost.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A first embodiment of the present disclosure will be described with reference to FIG. 1 to FIG. 7B. The embodiment described below is shown as a preferred specific example for implementing the present disclosure. While some part of the embodiment specifically illustrates various technically preferable matters, the technical scope of the present disclosure is not limited to such specific aspects.

Figure 1:
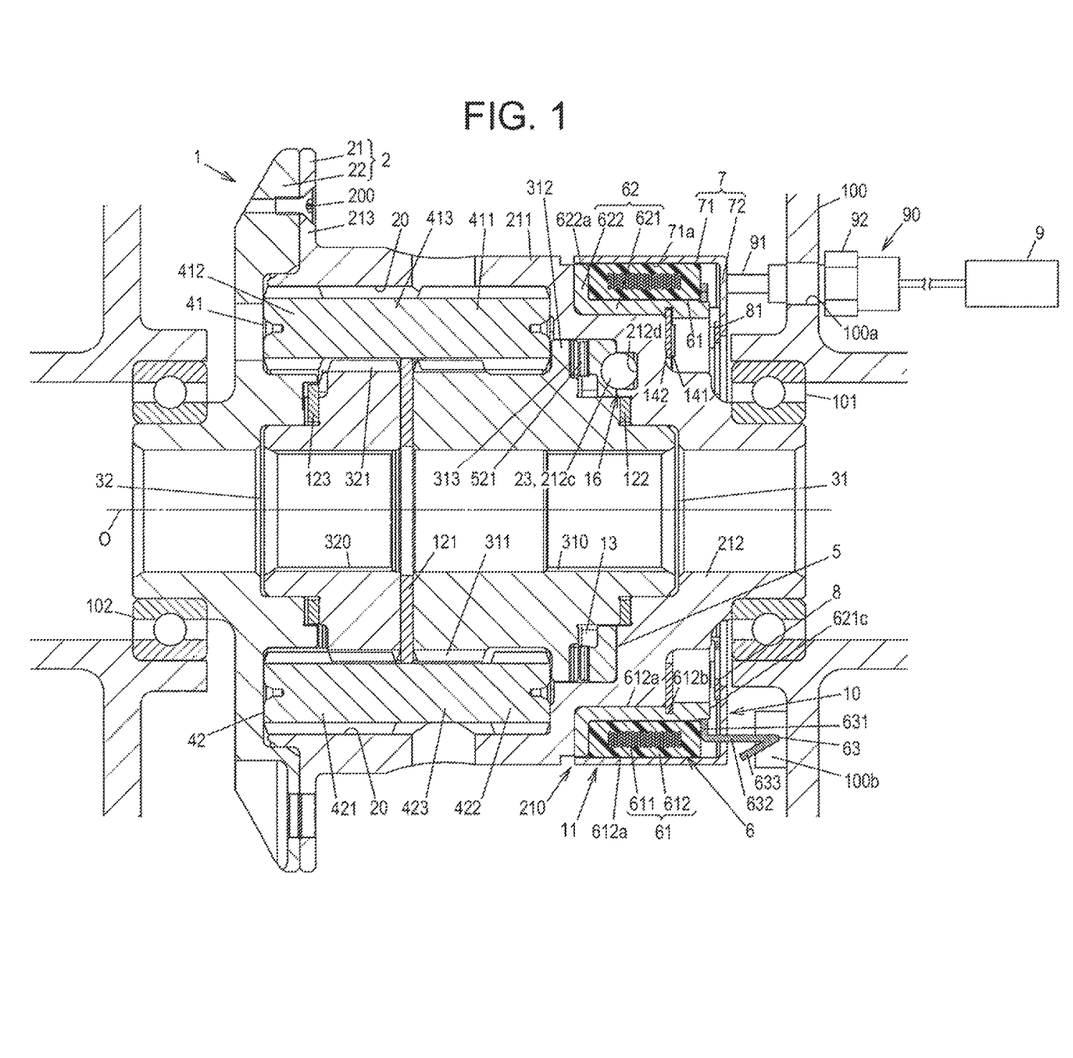
FIG. 1 is a sectional view showing an example of the configuration of a limited-slip differential according to a first embodiment of the present disclosure.
Figure 2:
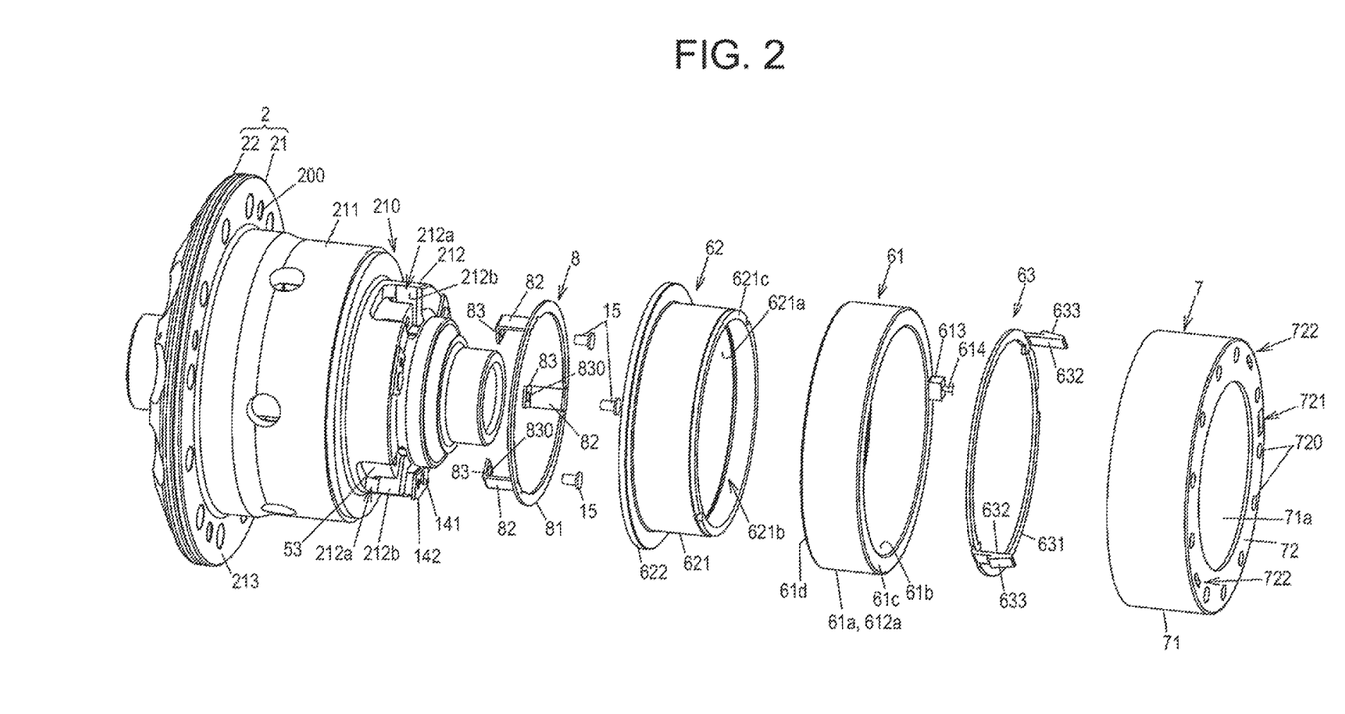
FIG. 2 is an exploded perspective view of the limited-slip differential.
Figure 3:
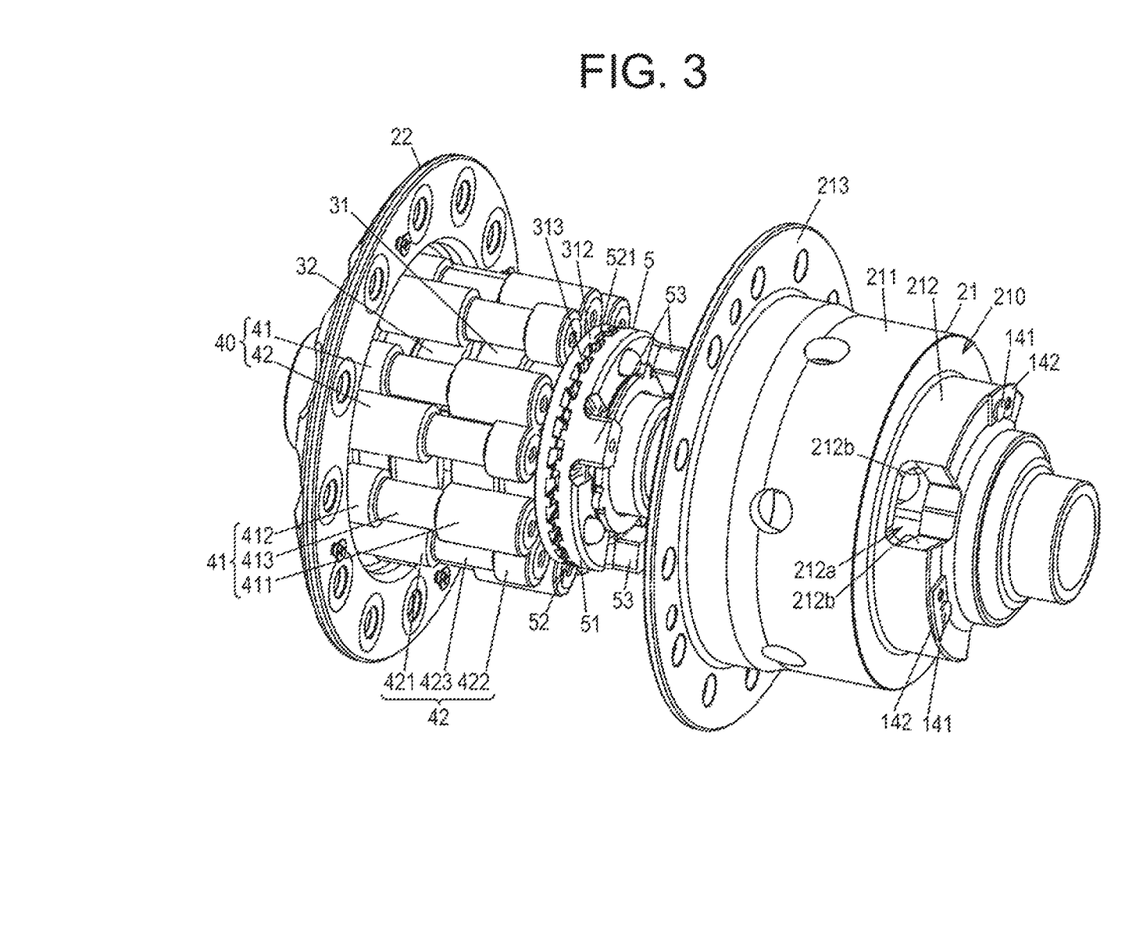
FIG. 3 is an exploded perspective view showing the internal structure of a differential case of the limited-slip differential.
Figure 4A:
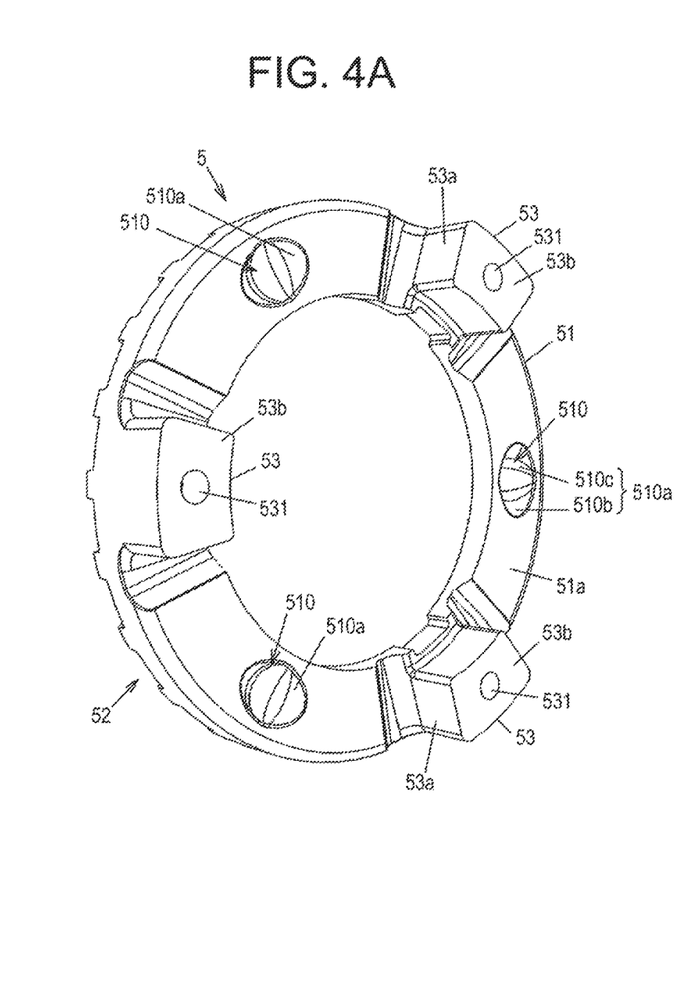
FIG. 4A is a perspective view showing an interrupting member.
Figure 4B:
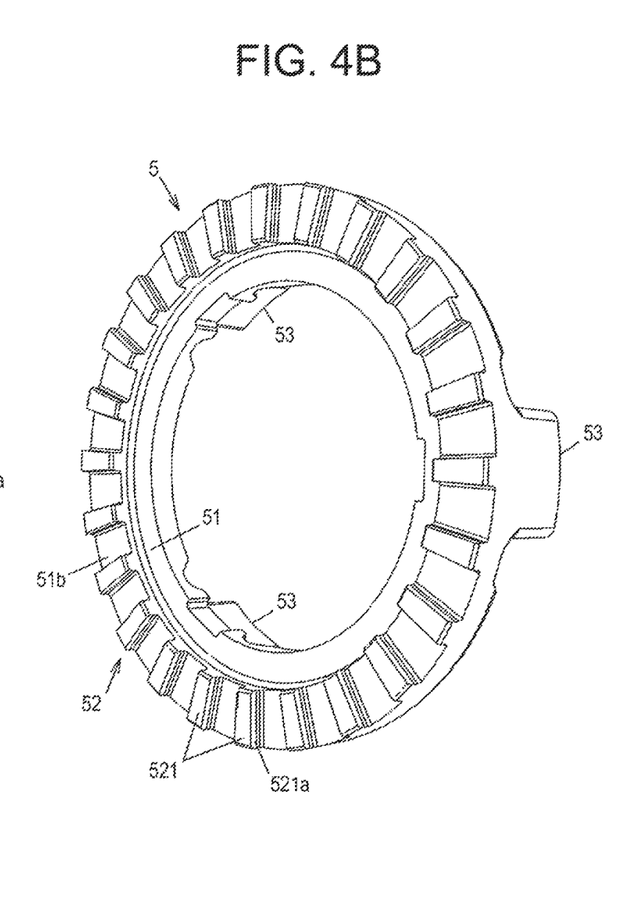
FIG. 4B is a perspective view showing the interrupting member.
Figure 5A:
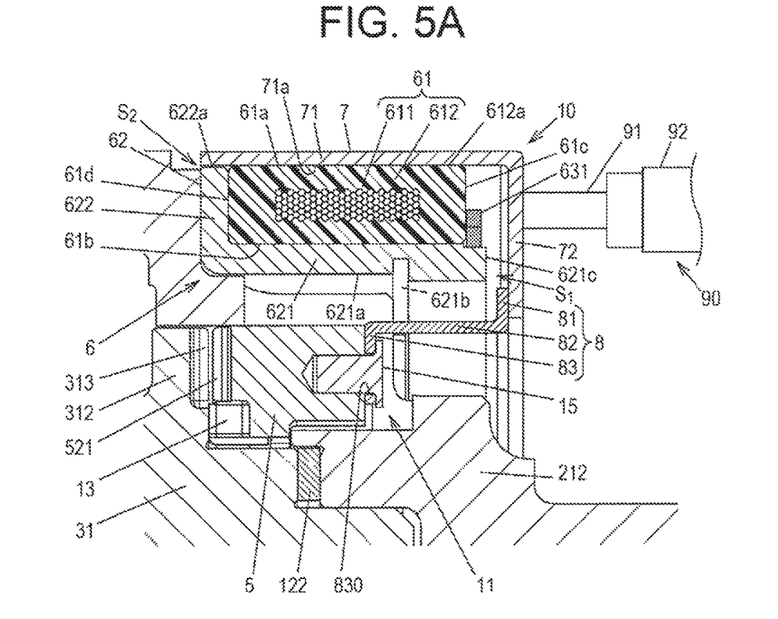
FIG. 5A is an enlarged sectional view showing a part of the limited-slip differential.
Figure 5B:
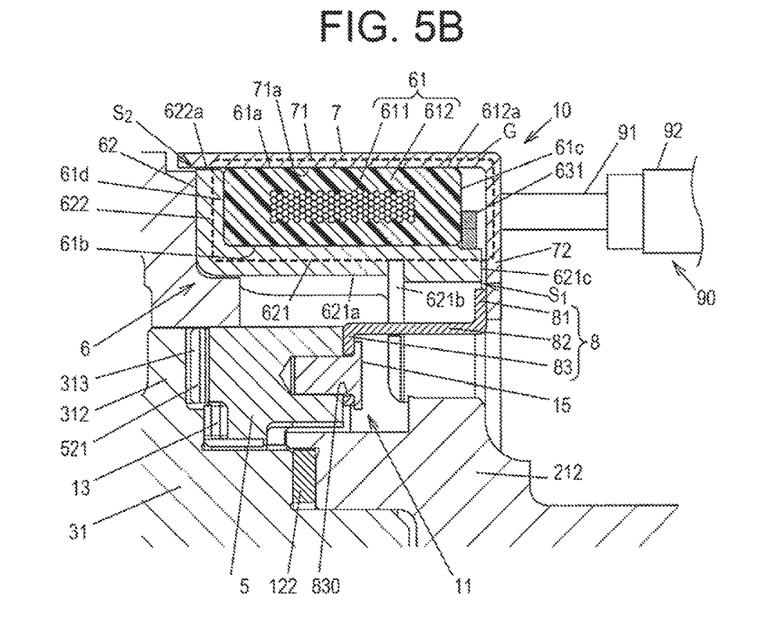
FIG. 5B is an enlarged sectional view showing a part of the limited-slip differential.

FIG. 1 is a sectional view showing an example of the configuration of a limited-slip differential according to the first embodiment of the present disclosure. FIG. 2 is an exploded perspective view of the limited-slip differential. FIG. 3 is an exploded perspective view showing the internal structure of a differential case of the limited-slip differential. FIG. 4A and FIG. 4B are perspective views showing an interrupting member. FIG. 5A and FIG. 5B are enlarged sectional views showing a part of the limited-slip differential.

A limited-slip differential 1 is used to allocate power from a driving source, such as an engine or an electric motor, of a vehicle to a pair of output shafts so as to allow for differential motion thereof. More specifically, the limited-slip differential 1 according to this embodiment is used, for example, as a differential gear that allocates power from a driving source to left and right wheels, and allocates input power to left and right drive shafts serving as a pair of output shafts.

The limited-slip differential 1 includes: a differential case 2 that rotates while being supported by a differential carrier 100 serving as a support; a first side gear 31 and a second side gear 32 housed inside the differential case 2; a plurality of (in this embodiment, five) pinion gear pairs 40 each composed of a first pinion gear 41 and a second pinion gear 42 engaged with each other; an interrupting member 5 that can interrupt power transmission between the differential case 2 and the first side gear 31; a moving mechanism 10 that moves the interrupting member 5 in an axial direction relative to the differential case 2; and a position sensor 90 that outputs an electrical signal indicating an action state of the moving mechanism 10. The interrupting member 5, the moving mechanism 10, and the position sensor 90 constitute a power transmission interrupting device 11 that interrupts power transmission between the differential case 2 and the first side gear 31. The power transmission interrupting device 11 is controlled by a controller 9.

The first side gear 31 and the second side gear 32 are cylindrical. A spline fitting part 310 to which one output shaft is coupled so as not to be rotatable relative to the first side gear 31 is formed in the inner circumferential surface of the first side gear 31, and a spline fitting part 320 to which the other output shaft is coupled so as not to be rotatable relative to the second side gear 32 is formed in the inner circumferential surface of the second side gear 32.

The differential case 2 is rotatably supported by the differential carrier 100, which is fixed to a vehicle body, through a pair of bearings 101, 102. As shown in FIG. 1, the differential carrier 100 is provided with a mounting hole 100a in which the position sensor 90 is mounted. The differential carrier 100) is packed with gear oil with a viscosity suitable for gear lubrication, and the limited-slip differential 1 is used in an environment lubricated by this gear oil.

The differential case 2, the first side gear 31, and the second side gear 32 are disposed so as to be rotatable relative to one another around a common rotational axis O. Hereinafter, a direction parallel to the rotational axis O will be referred to as the axial direction.

The differential case 2 has a plurality of retention holes 20 in which the first pinion gears 41 and the second pinion gears 42 of the pinion gear pairs 40 are rotatably retained. The first pinion gear 41 and the second pinion gear 42 revolve around the rotational axis O, and are rotatable inside the retention hole 20 with their respective central axes as the rotational axis.

The first side gear 31 and the second side gear 32 have the same outer diameter, and gear parts 311, 321 composed of a plurality of helical teeth are respectively formed on the outer circumferential surfaces. A center washer 121 is disposed between the first side gear 31 and the second side gear 32. A first side washer 122 is disposed on the lateral side of the first side gear 31, and a second side washer 123 is disposed on the lateral side of the second side gear 32.

The first pinion gear 41 integrally has a long gear part 411, a short gear part 412, and a coupling part 413 coupling together the long gear part 411 and the short gear part 412 in the axial direction. Similarly, the second pinion gear 42 integrally has a long gear part 421, a short gear part 422, and a coupling part 423 coupling together the long gear part 421 and the short gear part 422 in the axial direction.

The first pinion gear 41 has the long gear part 411 engaged with the gear part 311 of the first side gear 31 and the short gear part 422 of the second pinion gear 42, and has the short gear part 412 engaged with the long gear part 421 of the second pinion gear 42. The second pinion gear 42 has the long gear part 421 engaged with the gear part 321 of the second side gear 32 and the short gear part 412 of the first pinion gear 41, and has the short gear part 422 engaged with the long gear part 411 of the first pinion gear 41. In FIG. 3, the helical teeth of these gear parts are not shown.

When the first side gear 31 and the second side gear 32 rotate at the same speed, the first pinion gear 41 and the second pinion gear 42 revolve with the differential case 2 without rotating inside the retention holes 20. When the rotation speeds of the first side gear 31 and the second side gear 32 differ, for example, during turning of the vehicle, the first pinion gear 41 and the second pinion gear 42 revolve while rotating inside the retention holes 20. Thus, power input into the differential case 2 is allocated to the first side gear 31 and the second side gear 32 so as to allow for differential motion thereof. The differential case 2, the first side gear 31, and the second side gear 32 are examples of the first rotating member, the second rotating member, and the third rotating member, respectively, of the present disclosure.

The interrupting member 5 is movable in the axial direction between a coupling position at which the interrupting member 5 couples together the differential case 2 and the first side gear 31 so as not to be rotatable relative to each other, and an uncoupling position at which the interrupting member 5 allows the differential case 2 and the first side gear 31 to rotate relative to each other. FIG. 5A shows a state where the interrupting member 5 is at the uncoupling position, and FIG. 5B shows a state where the interrupting member 5 is at the coupling position.

When the interrupting member 5 is at the coupling position, differential motion of the differential case 2 and the first side gear 31 is restrained, so that the first pinion gear 41 and the second pinion gear 42 become unable to rotate, and differential motion of the differential case 2 and the second side gear 32 is also restrained. The interrupting member 5 is urged toward the uncoupling position by a return spring 13 disposed between the first side gear 31 and the interrupting member 5.

The moving mechanism 10 has: an annular magnetic flux generation unit 6 that generates magnetic flux when current is applied thereto; a plunger 7, formed by a soft magnetic body, that constitutes a magnetic path G (see FIG. 5B) of the magnetic flux of a rotating magnetic field generated as current is applied to the magnetic flux generation unit 6, and serves as a moving member moving in the axial direction with the interrupting member 5; and a coupling member 8 that couples together the interrupting member 5 and the plunger 7.

The magnetic flux generation unit 6 has an annular electromagnet 61 having a coil winding 611 and a molded resin part 612 molded around the coil winding 611, and a yoke 62 constituting part of the magnetic path G of the magnetic flux with the plunger 7. A stopper ring 63 that prevents extraction and rotation of the electromagnet 61 is fixed to the yoke 62. The electromagnet 61 has a rectangular shape in cross-section, with the coil winding 611 disposed at a central part, and a surface of the electromagnet 61 including an outer circumferential surface 61a (outer circumferential surface 612a of the molded resin part 612) is formed by the molded resin part 612.

As shown in FIG. 2, the electromagnet 61 is provided with a boss 613 protruding from one axial end face, and an electric wire 614 through which excitation current is supplied to the coil winding 611 is led out from the boss 613. The controller 9 supplies excitation current through the electric wire 614 to the magnetic flux generation unit 6 to generate magnetic flux in the magnetic path G.

The yoke 62 is made of a soft magnetic metal, such as low-carbon steel, and integrally has a cylindrical first yoke 621 covering an inner circumferential surface 61b of the electromagnet 61 from the inside, and an annular second yoke 622 protruding outward from one axial end of the first yoke 621 and covering an axial end face 61c of the electromagnet 61. The inner diameter of the first yoke 621 is slightly larger than the outer diameter of a part of the differential case 2 that faces an inner circumferential surface 621a of the first yoke 621.

Along the inner circumferential surface 621a of the first yoke 621, an annular recess 621b is formed into which a plurality of (in this embodiment, three) plates 142 made of a non-magnetic body and fixed to the differential case 2 with press-fit pins 141 are fitted. With the plates 142 fitted into the annular recess 621b, the yoke 62 is supported so as not to be movable in the axial direction relative to the differential case 2. The axial width of the annular recess 621b is slightly larger than the thickness of the plate 142 so that rotation resistance does not occur between the yoke 62 and the plates 142 when the differential case 2 rotates.

The stopper ring 63 is fixed to the end of the first yoke 621 of the yoke 62 that is located on the side opposite from the second yoke 622. The stopper ring 63 is made of a non-magnetic metal, such as austenitic stainless steel, and integrally has an annular part 631 fixed to the yoke 62, a pair of protrusions 632 protruding in the axial direction from the annular part 631 at two positions in the circumferential direction, and folded portions 633 that are folded at an acute angle from the leading ends of the protrusions 632.

The stopper ring 63 has the pair of protrusions 632 locked in locking portions 100b provided in the differential carrier 100, and is thereby prevented from rotating. The differential carrier 100 is provided with two locking portions 100b in which the pair of protrusions 632 are respectively locked, and only one of the locking portions 100b is shown in FIG. 1. The plunger 7 is prevented from being extracted from the stopper ring 63 by the folded portions 633, and is prevented from rotating relative to the differential carrier 100 as the protrusions 632 penetrate second through-holes 722. Thus, the plunger 7 is supported so as to be movable in the axial direction relative to the yoke 62 while being restrained from rotating relative to the yoke 62.

The plunger 7 is made of a soft magnetic metal, such as low-carbon steel, and integrally has a cylindrical part 71 disposed on the outer circumference of the magnetic flux generation unit 6, and an annular cover 72 extending in the radial direction from one axial end of the cylindrical part 71 and covering one of the axial end faces of the electromagnet 61. The cylindrical part 71 has a cylindrical shape covering the entire electromagnet 61 from the outer circumferential side. The annular cover 72 protrudes inward from one axial end of the cylindrical part 71. The annular cover 72 faces, in the axial direction, an axial end face 61d (the end face that is located on the side opposite from the axial end face 61c and faces the second yoke 622 of the yoke 62) of the electromagnet 61, the annular part 631 of the stopper ring 63, and the axial end face 621c of the first yoke 621 of the yoke 62.

In the yoke 62, the electromagnet 61 is held in the radial direction between the first yoke 621 and the cylindrical part 71 of the plunger 7, and the electromagnet 61 is held in the axial direction between the second yoke 622 and the annular cover 72 of the plunger 7.

The plunger 7 and the yoke 62 have a first space $S_1$ formed between the annular cover 72 and the first yoke 621, and a second space $S_2$ formed between the cylindrical part 71 and the second yoke 622. One of the first space $S_1$ and the second space $S_2$ is a space in the radial direction of the electromagnet 61, and in this embodiment, the second space $S_2$ is a space in the radial direction of the electromagnet 61. The first space $S_1$ is a space in the axial direction of the electromagnet 61. When current is applied to the coil winding 611, the interrupting member 5 moves in the axial direction as the plunger 7 moves so that the interval between the annular cover 72 and the one end face of the electromagnet 61 changes to reduce the first space $S_1$.

The plunger 7 is supported by the electromagnet 61 so as to be movable in the axial direction, with an inner circumferential surface 71a of the cylindrical part 71 in contact with the molded resin part 612. In this embodiment, the plunger 7 is guided so as to be movable in the axial direction, with the cylindrical part 71 in sliding contact with the outer circumferential surface 612a of the molded resin part 612. When the plunger 7 moves in the axial direction, the inner circumferential surface 71a of the cylindrical part 71 slides on the outer circumferential surface 612a of the molded resin part 612. The inner circumferential surface 71a of the cylindrical part 71 faces an end face 622a on the outer circumferential side of the second yoke 622 of the yoke 62 in the radial direction across the second space $S_2$.

The annular cover 72 has a plurality of (in the example shown in FIG. 2, ten) oil holes 720 through which the above-mentioned gear oil flows, a first through-hole 721 through which the boss 613 of the electromagnet 61 is inserted, and the two second through-holes 722 through which the pair of protrusions 632 of the stopper ring 63 are respectively inserted. The coupling member 8 butts against the inner circumferential-side end of the annular cover 72.

The coupling member 8 is formed, for example, by pressing a plate material made of a non-magnetic metal such as austenitic stainless steel, and integrally has a ring-shaped annular part 81 that butts against the annular cover 72 of the plunger 7, three extension portions 82 extending from the annular part 81 in the axial direction, and fixing portions 83 protruding inward from the leading ends of the extension portions 82 and fixed to the interrupting member 5. The coupling member 8 rotates with the differential case 2, with the annular part 81 sliding on the annular cover 72 of the plunger 7. The fixing portion 83 has an insert hole 830 through which a press-fit pin 15 is inserted to fix the coupling member 8 to the interrupting member 5.

The differential case 2 has a first case member 21 and a second case member 22 fixed to each other with a plurality of screws 200. The first case member 21 is rotatably supported by the differential carrier 100 through the bearing 101, while the second case member 22 is rotatably supported by the differential carrier 100 through the bearing 102.

The first case member 21 integrally has a cylindrical part 211 that rotatably retains the plurality of pinion gear pairs 40, a bottom 212 extending inward from one end of the cylindrical part 211, and a flange 213 butted against the second case member 22. An annular recess 210 in which the magnetic flux generation unit 6 is disposed is formed at a corner between the cylindrical part 211 and the bottom 212.

The first side gear 31 and the second side gear 32 are disposed inside the cylindrical part 211. The first case member 21 is made of a metal with lower magnetic permeability than the yoke 62, and a ring gear (not shown) is fixed to the flange 213. The differential case 2 is rotated around the rotational axis O by power transmitted through the ring gear.

As shown in FIG. 2 and FIG. 3, the bottom 212 of the first case member 21 has a plurality of insert holes 212a into which the extension portions 82 and the fixing portions 83 of the coupling member 8 are inserted. The insert holes 212a penetrate the bottom 212 in the axial direction. Projections 53 of the interrupting member 5, to be described later, are also inserted into the insert holes 212a. As the projections 53 are inserted into the insert holes 212a, the interrupting member 5 is restrained from rotating relative to the differential case 2. In this embodiment, three insert holes 212a are formed at regular intervals in the circumferential direction of the bottom 212.

When excitation current is supplied to the electromagnet 61, magnetic flux is generated in the magnetic path G shown in FIG. 5B, so that the annular cover 72 of the plunger 7 is attracted to the yoke 62. Thus, the plunger 7 moves in the axial direction, with the inner circumferential surface 71a of the cylindrical part 71 sliding on the outer circumferential surface 612a of the molded resin part 612. As the plunger 7 thus moves in the axial direction, the interrupting member 5 coupled to the plunger 7 by the coupling member 8 moves in the axial direction from the uncoupling position to the coupling position.

The outermost diameter (the diameter at the outermost part) of the interrupting member 5 is smaller than the inner diameter of the yoke 62, and the interrupting member 5 is disposed inside the magnetic flux generation unit 6. As shown in FIG. 4A and FIG. 4B, the interrupting member 5 integrally has an annular plate-like disc part 51 in one axial end face 51a of which a plurality of bowl-shaped recesses 510 are formed, an engaging part 52 formed in the other axial end face 51b of the disc part 51 that faces the first side gear 31 in the axial direction, and the trapezoidal columnar projections 53 formed so as to project in the axial direction from the one axial end face 51a of the disc part 51.

The one axial end face 51a of the disc part 51 faces the bottom 212 of the first case member 21 in the axial direction. The projections 53 are partially inserted into the insert holes 212a formed in the bottom 212 of the first case member 21. The engaging part 52 has a plurality of engaging teeth 521 protruding in the axial direction. The plurality of engaging teeth 521 are formed in a part on the outer circumferential side of the other axial end face 51b of the disc part 51, and a part of the axial end face 51b further on the inner side than the engaging part 52 serves as a flat receiving surface against which the return spring 13 butts and which receives an urging force thereof toward the uncoupling position.

As shown in FIG. 1, the first side gear 31 has a plurality of engaging teeth 313, engaging with the plurality of engaging teeth 521 of the interrupting member 5, formed in an annular wall 312 that is provided so as to protrude further toward the outer circumferential side than the gear part 311.

As the interrupting member 5 is pressed by the plunger 7 through the coupling member 8 so as to move to the coupling position, the plurality of engaging teeth 521 of the engaging part 52 engage with the plurality of engaging teeth 313 of the first side gear 31. That is, when the interrupting member 5 moves toward the first side gear 31, the interrupting member 5 and the first side gear 31 are coupled together so as not to be rotatable relative to each other through engagement between the pluralities of engaging teeth 521, 313. Thus, differential motion of the differential case 2 and the first and second side gears 31, 32 is limited. Conversely, when the interrupting member 5 moves to the uncoupling position under the urging force of the return spring 13, the engaging teeth 521, 313 are disengaged, so that the interrupting member 5 and the first side gear 31 can rotate relative to each other.

In the first case member 21, engaged parts with which the projections 53 of the interrupting member 5 engage in the circumferential direction are formed by the insert holes 212a. The projection 53 of the interrupting member 5 has a butting surface 53a that butts against an inner surface 212b (see FIGS. 2 and 3) of the insert hole 212a and receives power from the first case member 21. The butting surface 53a is the end face of the projection 53 in the circumferential direction. The butting surface 53a of the projection 53 and the inner surface 212b of the insert hole 212a against which the butting surface 53a butts are flat surfaces parallel to the rotational axis O. When the interrupting member 5 receives power from the first case member 21, the butting surface 53a of the projection 53 comes in surface contact with the inner surface 212b of the insert hole 212a.

A press-fit hole 531 into which the press-fit pin 15S is press-fitted is formed in a leading end face 53b of the projection 53. As the press-fit pins 15 inserted through the insert holes 830 formed in the fixing portions 83 of the coupling member 8 are press-fitted into the press-fit holes 531, the interrupting member 5 is fixed so as to move integrally with the coupling member 8 in the axial direction. Alternatively, the fixing portions 83 of the coupling member 8 and the projections 53 of the interrupting member 5 may be fastened together with bolts instead of the press-fit pins 15. In this case, screw holes, instead of the press-fit holes 531, are formed in the leading end faces 53b of the projections 35.

An inner surface 510a of the bowl-shaped recess 510 is formed as a cam surface that generates a cam thrust force in the axial direction through rotation relative to the first case member 21. In other words, portions of the surface (one axial end face 51a) of the disc part 51 of the interrupting member 5 facing the bottom 212 of the first case member 21 are formed as the cam surface.

As shown in FIG. 1, the bottom 212 of the first case member 21 is provided with protrusions 212c protruding in the axial direction that butt against the inner surfaces 510a of the bowl-shaped recesses 510. In this embodiment, the protrusions 212c are formed by spherical bodies 23 fixed to the bottom 212. The spherical body 23 is retained on the first case member 21 while partially being housed in an axial dent 212d provided in the bottom 212. Alternatively, the protrusion 212c may be integrally formed as a part of the bottom 212.

The width in the circumferential direction of the insert hole 212a of the bottom 212 is larger than the width in the circumferential direction of the projection 53 of the interrupting member 5, so that the differential case 2 and the interrupting member 5 are rotatable relative to each other within a predetermined angular range according to the difference in width in the circumferential direction between the insert hole 212a and the projection 53. In the interrupting member 5, the inner surface 510a of the bowl-shaped recess 510 is formed over an angular range larger than this predetermined angular range. Thus, even when the interrupting member 5 rotates relative to the differential case 2, the leading end of the protrusion 212c (spherical body 23) always remains housed inside the bowl-shaped recess 510 and faces the inner surface 510a in the axial direction.

The protrusions 212c of the bottom 212 of the first case member 21 and the bowl-shaped recesses 510 of the disc part 51 of the interrupting member 5 constitute a cam mechanism 16 that generates an axial thrust force by which the interrupting member 5 is separated from the bottom 212. Next, actions of the cam mechanism 16 will be described with reference to FIG. 6A to FIG. 6C.

Figure 6A:
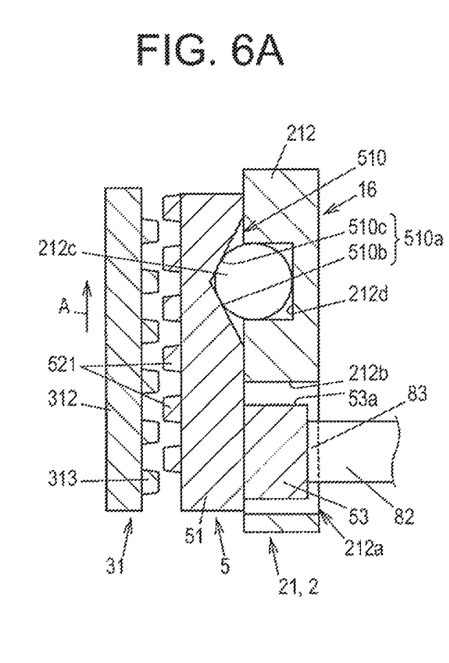
FIG. 6A is a sectional view of the interrupting member, a bottom of a first case member, and an annular wall of a first side gear as seen from a circumferential direction, schematically illustrating an action of a cam mechanism.
Figure 6B:
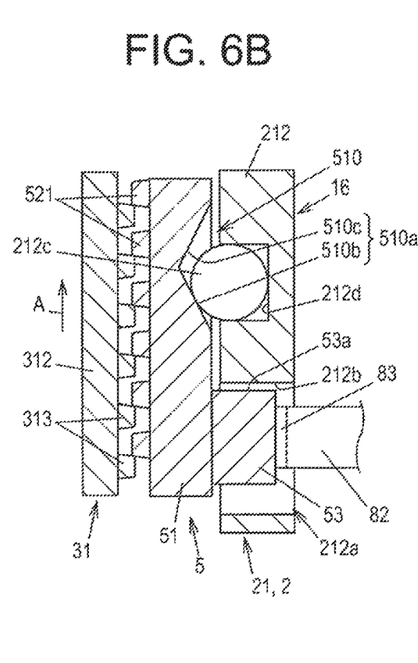
FIG. 6B is a sectional view of the interrupting member, the bottom of the first case member, and the annular wall of the first side gear as seen from the circumferential direction, schematically illustrating an action of the cam mechanism.
Figure 6C:
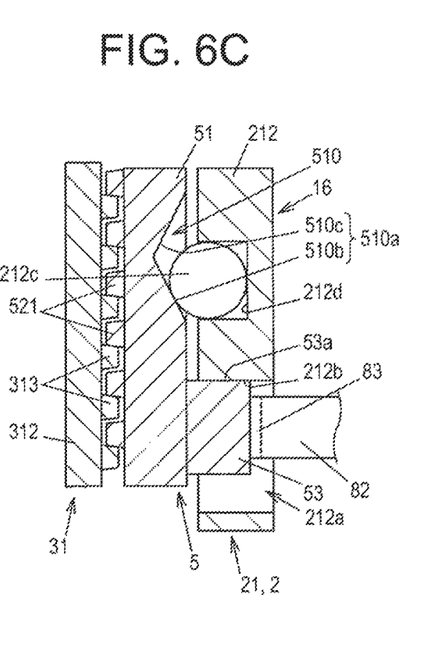
FIG. 6C is a sectional view of the interrupting member, the bottom of the first case member, and the annular wall of the first side gear as seen from the circumferential direction, schematically illustrating an action of the cam mechanism.

FIG. 6A to FIG. 6C are sectional views of the interrupting member 5, the bottom 212 of the first case member 21, and the annular wall 312 of the first side gear 31 as seen from the circumferential direction, schematically illustrating the actions of the cam mechanism 16. In FIG. 6A and FIG. 6B, the direction of rotation of the first side gear 31 relative to the differential case 2 (first case member 21) is indicated by the arrow A.

As shown in FIG. 6A, the inner surface 510a of the bowl-shaped recess 510 is formed by a first inclined surface 510b and a second inclined surface 510c inclined respectively to one side and the other side relative to the circumferential direction of the interrupting member 5. The inclination angles of the first inclined surface 510b and the second inclined surface 510c relative to the circumferential direction of the interrupting member 5 are the same.

When no current is applied to the electromagnet 61, the interrupting member 5 is pressed against the bottom 212 of the first case member 21 under the urging force of the return spring 13. This state is shown in FIG. 6A. As shown in FIG. 6A, the protrusion 212c of the bottom 212 butts against the deepest portion of the bowl-shaped recess 510, and the engaging teeth 521 of the interrupting member 5 and the engaging teeth 313 of the first side gear 31 are disengaged. When current is applied to the electromagnet 61, the interrupting member 5 is pressed against the plunger 7 through the coupling member 8, and the interrupting member 5 engages with the first side gear 31. FIG. 6B shows a state at the beginning of this engagement, and FIG. 6C shows a state upon completion of the engagement.

As shown in FIG. 6B, when current is applied to the electromagnet 61 and the interrupting member 5 is pressed, first, the engaging teeth 521 of the interrupting member 5 and the engaging teeth 313 of the first side gear 31 engage with each other at the tips. Thus engaged, the interrupting member 5 rotates along with the first side gear 31 to rotate relative to the differential case 2, while the protrusion 212c of the bottom 212 slides on the first inclined surface 510b or the second inclined surface 510c of the bowl-shaped recess 510. FIG. 6B shows the case where the protrusion 212c of the bottom 212 slides on the first inclined surface 510b of the bowl-shaped recess 510. As the protrusion 212c of the bottom 212 thus slides, the portion against which the protrusion 212c butts moves gradually to a shallow portion of the bowl-shaped recess 510, causing the interrupting member 5 to move toward the first side gear 31 under the cam thrust force.

The interrupting member 5 is restrained from rotating relative to the differential case 2, as the butting surface 53a of the projection 53 of the interrupting member 5 comes in contact with the inner surface 212b of the insert hole 212a of the first case member 21. Specifically, when the butting surface 53a of the projection 53 of the interrupting member 5 butts against the inner surface 212b of the insert hole 212a as shown in FIG. 6C, the interrupting member 5 stops rotating relative to the differential case 2, and the interrupting member 5 also stops moving in the axial direction relative to the differential case 2.

In the state where the engaging teeth 521 of the interrupting member 5 and the engaging teeth 313 of the first side gear 31 are completely engaged with each other, the differential case 2 and the interrupting member 5 are restrained from rotating relative to each other as the projection 53 of the interrupting member 5 is engaged in the insert hole 212a of the first case member 21, while the interrupting member 5 and the first side gear 31 are restrained from rotating relative to each other as the engaging teeth 521 of the interrupting member 5 and the engaging teeth 313 of the first side gear 31 are engaged with each other. Thus, relative rotation of the differential case 2 and the first side gear 31 is restrained, so that power is transmitted from the differential case 2 through the interrupting member 5 to the first side gear 31.

As differential motion of the differential case 2 and the first side gear 31 is restrained, the first pinion gear 41 and the second pinion gear 42 become unable to rotate. Accordingly, differential motion of the differential case 2 and the second side gear 32 is also restrained, so that power is transmitted from the differential case 2 through the first pinion gear 41 and the second pinion gear 42 to the second side gear 32.

The actions of the moving mechanism 10 are detected by the position sensor 90. The position sensor 90 outputs an electrical signal to the controller 9 according to the axial position of the annular cover 72 of the plunger 7.

Figure 7A:
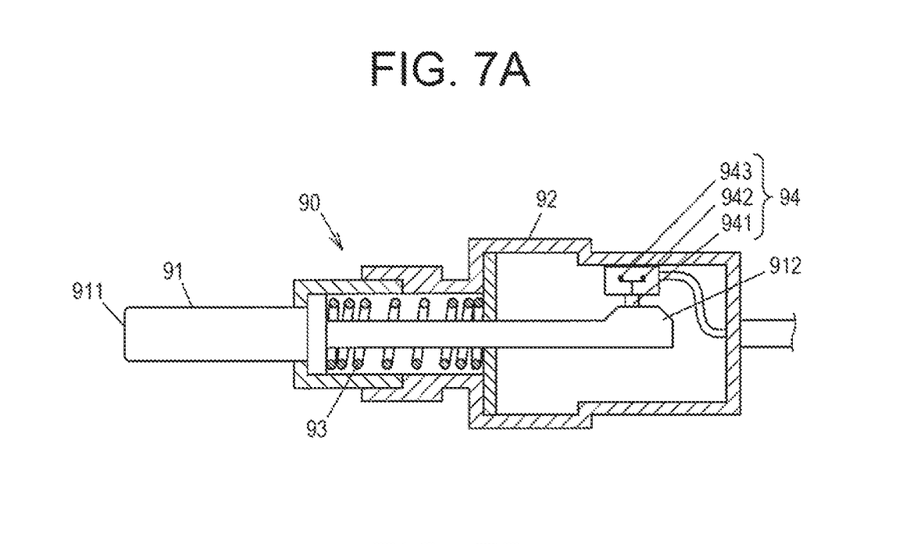
FIG. 7A is a diagram schematically showing an example of the configuration of a position sensor.
Figure 7B:
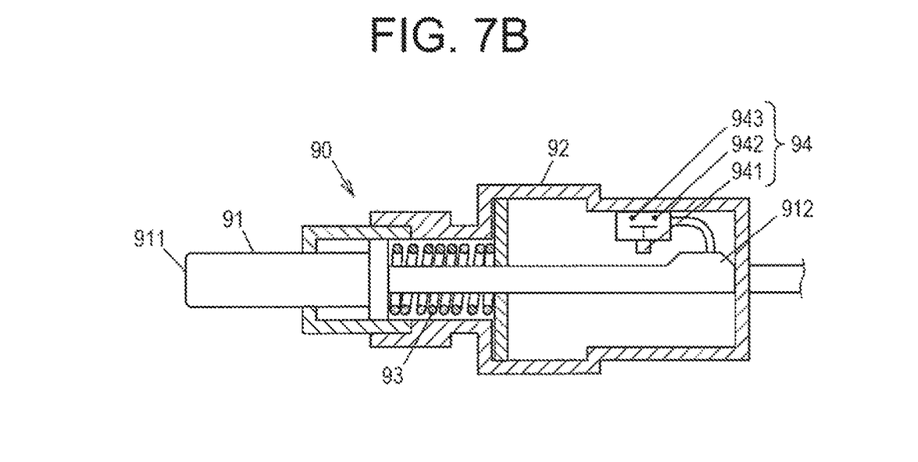
FIG. 7B is a diagram schematically showing an example of the configuration of the position sensor.

FIG. 7A and FIG. 7B are diagrams schematically showing examples of the configuration of the position sensor 90. In this embodiment, the position sensor 90 detects the axial position of the annular cover 72 of the plunger 7. The position sensor 90 has a contactor 91 that elastically comes in contact with the annular cover 72 of the plunger 7, a support 92 that supports the contactor 91, a spring 93 that urges the contactor 91 in a direction in which the contactor 91 sticks out from the support 92, and a switch 94 that is turned on and off according to a shift of the contactor 91 relative to the support 92.

The contactor 91 is a rod-like member that moves forward and backward relative to the support 92 in a direction parallel to the rotational axis O. Under the urging force of the spring 93, the contactor 91 butts at a leading end 911 against the outer surface (the side surface opposite from the surface facing the magnetic flux generation unit 6) of the annular cover 72 of the plunger 7. A bulge 912 bulging in a direction orthogonal to the moving direction of the contactor 91 is provided at the other end of the contactor 91. When a movable piece 941 of the switch 94 is pushed in by the bulge 912 as the contactor 91 moves, a pair of terminals 942, 943 are electrically short-circuited.

The mounting position of the position sensor 90 in the differential carrier 100 is adjusted so that, when the interrupting member 5 moves to the coupling position as the plunger 7 moves in the axial direction, the pair of terminals 942, 943 of the switch 94 are electrically short-circuited to turn on the electrical signal, and so that, when the interrupting member 5 is at the uncoupling position, the pair of terminals 942, 943 of the switch 94 are insulated from each other to turn off the electrical signal. FIG. 7A shows the state where the interrupting member 5 is at the coupling position, and FIG. 7B shows the state where the interrupting member 5 is at the uncoupling position.

If, after supplying excitation current to the electromagnet 61, the controller 9 cannot detect that the interrupting member 5 has moved to the coupling position through the electrical signal from the position sensor 90, the controller 9 outputs an abnormal signal. This abnormal signal is recognized by a driver of the vehicle through an indicator lamp or a warning alarm.

The first embodiment having been described above offers the following main advantages.

The plunger 7 has the cylindrical part 71 and the annular cover 72, so that the annular magnetic path G is formed around the electromagnet 61 between the first yoke 621 and the second yoke 622 of the yoke 62. Thus, the configuration of the moving mechanism 10 including the yoke 62 can be simplified, and the manufacturing cost can be thereby reduced.

The cylindrical first yoke 621 of the yoke 62 covers the inner circumferential surface 61b of the electromagnet 61 from the inside, while the second yoke 622 of the yoke 62 protrudes from one axial end of the first yoke 621 and covers the axial end face 61c of the electromagnet 61. Accordingly, a sufficient space to dispose the electromagnet 61 can be secured.

The second space $S_2$ in the radial direction of the electromagnet 61 is formed between the plunger 7 and the yoke 62, and the dimension of the second space $S_2$ does not change even when the plunger 7 moves in the axial direction. Thus, even when the change in magnetic resistance in the magnetic path G occurring as the plunger 7 moves in the axial direction is small and the plunger 7 remains at the initial position (uncoupling position), the plunger 7 can be reliably attracted by the magnetic force of the electromagnet 61.

Since the first space $S_1$ in the axial direction of the electromagnet 61 is formed between the plunger 7 and the yoke 62, the attraction force that acts when the plunger 7 moves as current is applied to the electromagnet 61 (the moving force in the axial direction) can be enhanced. As one of the first space $S_1$ and the second space $S_2$ formed between the plunger 7 and the yoke 62 is a space in the axial direction of the electromagnet 61 and the other is a space in the radial direction of the electromagnet 61, both a distance over which the plunger 7 can be attracted and an attraction force by which the plunger 7 can be attracted can be secured.

The electromagnet 61 has the coil winding 611 molded in the molded resin part 612, and the plunger 7 is supported by the electromagnet 61 in contact with the outer circumferential surface 612a of the molded resin part 612. Thus, it is possible to support the plunger 7 so as to be movable in the axial direction by a simple configuration while suppressing the sliding resistance of the plunger 7 moving in the axial direction.

With the cylindrical part 71 disposed on the outer circumference of the magnetic flux generation unit 6, the plunger 7 is prevented from rotating relative to the differential carrier 100, and the position sensor 90 outputs an electrical signal to the controller 9 according to the axial position of the plunger 7. Thus, even when the differential case 2 rotates, the contactor 91 of the position sensor 90 and the plunger 7 do not slide on each other. Accordingly, wear and heat generation do not occur between the plunger 7 and the contactor 91 of the position sensor 90, which enhances the reliability of the position sensor 90.

The position sensor 90 detects the axial position of the annular cover 72 of the plunger 7, and thus the position of the plunger 7 can be accurately detected by a simple configuration. Moreover, the position sensor 90 is composed of the contactor 91 that elastically comes in contact with the annular cover 72 of the plunger 7 under the urging force of the spring 93, the support 92 that supports the contactor 91, and the switch 94 that is turned on and off according to the shift of the contactor 91 relative to the support 92. Thus, the position of the annular cover 72 of the plunger 7 can be accurately detected by a simple configuration.

As the interrupting member 5 is disposed inside the magnetic flux generation unit 6, the power transmission interrupting device 11 and the limited-slip differential 1 can be reduced in size.

Figure 8A:
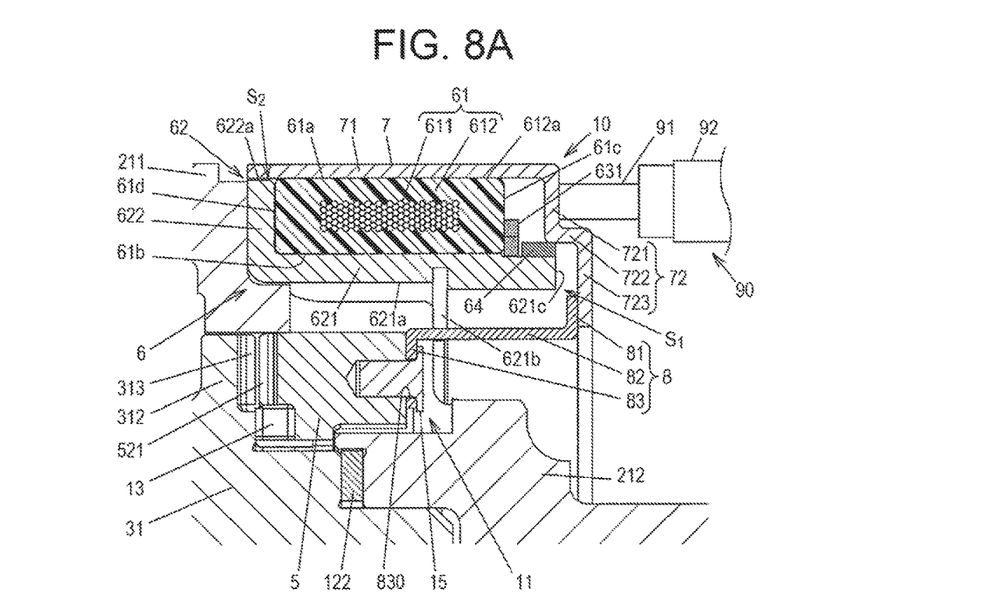
FIG. 8A is an enlarged sectional view showing a part of a limited-slip differential according to a second embodiment.
Figure 8B:
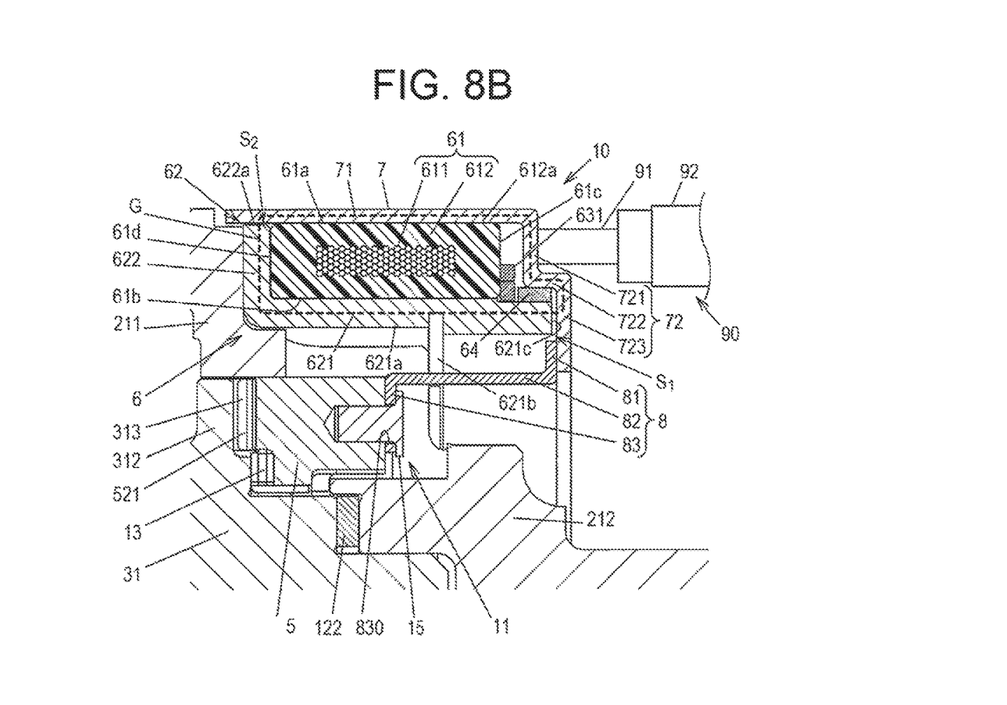
FIG. 8B is an enlarged sectional view showing a part of the limited-slip differential according to the second embodiment.

Next, a second embodiment of the present disclosure will be described with reference to FIG. 8A and FIG. 8B. This embodiment is different from the first embodiment in the shape of the plunger 7 and the structure for supporting the plunger 7. As the second embodiment is otherwise the same as the first embodiment, only these differences will be described. In FIG. 8A and FIG. 8B, those components that are the same as in the first embodiment will be denoted by the same reference signs as in FIG. 5A etc. and a repeated description thereof will be omitted.

FIG. 8A and FIG. 8B are enlarged sectional views showing a part of a limited-slip differential according to the second embodiment. FIG. 8A shows a state where the interrupting member 5 is at the uncoupling position, and FIG. 8B shows a state where the interrupting member 5 is at the coupling position.

The annular cover 72 of the plunger 7 according to this embodiment has an outer circumferential wall 721 facing the axial end face 61c of the electromagnet 61, a cylindrical wall 722 extending in the axial direction from the inner circumferential-side end of the outer circumferential wall 721, and an inner circumferential wall 723 extending toward the inner circumferential side from the axial end of the cylindrical wall 722. The inner circumferential wall 723 is separated further from the electromagnet 61 than the outer circumferential wall 721 in the axial direction. The first space S in the axial direction of the electromagnet 61 is formed between the inner circumferential wall 723 and the axial end face 621c of the first yoke 621. The annular part 81 of the coupling member 8 is butted against the inner circumferential wall 723 of the annular cover 72.

One axial end of the first yoke 621 of the yoke 62 is disposed inside the cylindrical wall 722 of the plunger 7. A sliding member 64, formed by a non-magnetic body, is fixed to the outer circumferential surface at that one end of the first yoke 621. The plunger 7 is guided so as to be movable in the axial direction, with the inner circumferential surface of the cylindrical wall 722 sliding on the outer circumferential surface of the sliding member 64. When current is applied to the electromagnet 61, magnetic flux is generated in the magnetic path G shown in FIG. 8B, and the plunger 7 moves in the axial direction toward the electromagnet 61 so as to reduce the first space $S_1$. As a result, the plurality of engaging teeth 521 of the interrupting member 5 engage with the annular wall 312 of the first side gear 31.

This embodiment can achieve effects similar to those of the first embodiment.

Figure 9A:
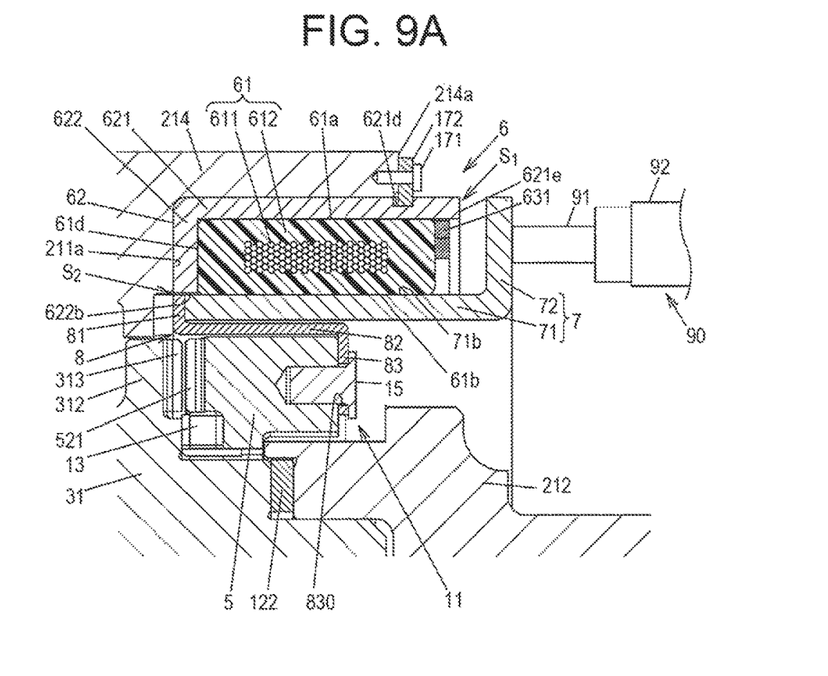
FIG. 9A is an enlarged sectional view showing a part of a limited-slip differential according to a third embodiment.
Figure 9B:
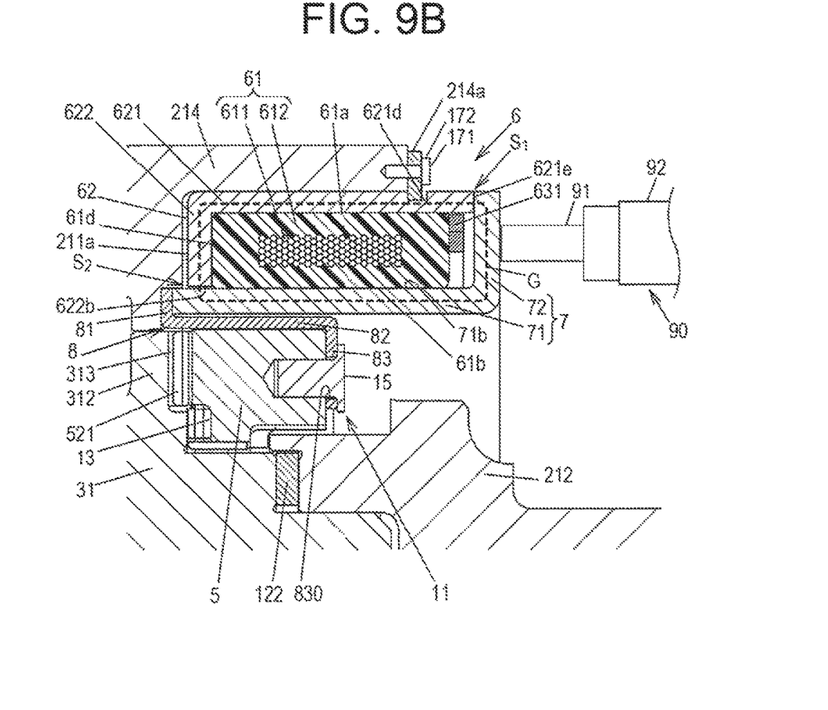
FIG. 9B is an enlarged sectional view showing a part of the limited-slip differential according to the third embodiment.

Next, a third embodiment of the present disclosure will be described with reference to FIG. 9A and FIG. 9B. This embodiment is different from the first embodiment in the shapes of the yoke 62, the plunger 7, and the coupling member 8, etc. As the third embodiment is otherwise the same as the first embodiment, only these differences will be described. In FIG. 9A and FIG. 9B, those components that are the same as in the first embodiment will be denoted by the same reference signs as in FIG. 5A etc., and a repeated description thereof will be omitted.

In the first embodiment, the case has been described in which the yoke 62 integrally has the cylindrical first yoke 621 and the annular second yoke 622 and the first yoke 621 covers the inner circumferential surface 61b of the electromagnet 61 from the inside. In this embodiment, the yoke 62 integrally has the cylindrical first yoke 621 and the annular second yoke 622 as in the first embodiment, but the first yoke 621 covers the outer circumferential surface 61a, not the inner circumferential surface 61b, of the electromagnet 61 from the outside. The second yoke 622 faces an axial end face 211a of the cylindrical part 211 of the differential case 2.

The annular part 631 of the stopper ring 63 is fixed to the inner circumferential surface of the first yoke 621. As in the first embodiment, the plunger 7 is prevented from rotating relative to the differential carrier 100 by the stopper ring 63. The yoke 62 has the electromagnet 61 held between the second yoke 622 and the annular part 631 of the stopper ring 63.

In this embodiment, an annular cover 214 that covers a part of the first yoke 621 from the outer circumferential side is provided integrally with the cylindrical part 211 of the differential case 2. An annular recess 621d is formed in the outer circumferential surface of the first yoke 621. Plates 172 fixed with pins 171 to an axial end face 214a of the cover 214 are engaged in the annular recess 621d. The thickness of the plate 172 in the axial direction of the electromagnet 61 is smaller than the width of the annular recess 621d in the axial direction, and the plates 172 are loosely fitted in the annular recess 621d.

As the second yoke 622 butts against the axial end face 211a as shown in FIG. 9A, the yoke 62 is restrained from moving relative to the differential case 2 in the axial direction in which the second yoke 622 moves closer to the axial end face 211a of the differential case 2. On the other hand, as the annular recess 621d and the plates 172 engage with each other as shown in FIG. 9B, the yoke 62 is restrained from moving relative to the differential case 2 in the axial direction in which the second yoke 622 moves away from the axial end face 211a of the differential case 2.

In the first embodiment, the case has been described in which the plunger 7 has the cylindrical part 71 and the annular cover 72, and the cylindrical part 71 covers the electromagnet 61 from the outer circumferential side. In this embodiment, the plunger 7 integrally has the cylindrical part 71 and the annular cover 72 as in the first embodiment, but the cylindrical part 71 covers the electromagnet 61 from the inner circumferential side and not from the outer circumferential side. The plunger 7 is guided so as to be movable in the axial direction, with the cylindrical part 71 sliding on the inner circumferential surface 61b of the molded resin part 612 of the electromagnet 61. The annular cover 72 protrudes outward from one end (the end on the side opposite from the axial end face 211a of the differential case 2) of the cylindrical part 71.

The first space $S_1$ in the axial direction of the electromagnet 61 is formed between an axial end face 621e of the first yoke 621 and the annular cover 72 of the plunger 7. The second space $S_2$ in the radial direction of the electromagnet 61 is formed between an inner circumferential-side end face 622b of the second yoke 622 and an outer circumferential surface 71b of the cylindrical part 71 of the plunger 7. When current is applied to the coil winding 611, the plunger 7 moves so as to reduce the first space $S_1$.

As in the first embodiment, the coupling member 8 according to this embodiment integrally has the ring-shaped annular part 81, the three extension portions 82 (only one extension portion 82 is shown in FIG. 9A and FIG. 9B) extending from the annular part 81 in the axial direction, and the fixing portions 83 protruding inward from the leading ends of the extension portions 82 and fixed to the interrupting member 5. However, the annular part 81 is butted not against the annular cover 72 of the plunger 7 but against the end face of the cylindrical part 71 located on the side of the axial end face 211a of the differential case 2. The force for moving the plunger 7 that is generated as current is applied to the coil winding 611 is transmitted to the interrupting member 5 by the coupling member 8.

This embodiment can also achieve effects similar to those of the first embodiment.

While the present disclosure has been described above on the basis of the embodiments, the present disclosure is not limited to these embodiments and can be implemented with modifications made thereto as appropriate within the scope of the gist of the disclosure. For example, in the embodiments, the case has been described in which the present disclosure is applied to a parallel-axis differential gear in which the rotational axes of the pair of side gears (first side gear 31 and second side gear 32) and those of the pair of pinion gears (first pinion gear 41 and second pinion gear 42) are parallel. However, the present disclosure is applicable not only to this type of gear but also to a limited-slip differential in which a pair of side gears and a pair of pinion gears engage with each other with their gear axes orthogonally crossed.

What is claimed is:

1. A power transmission interrupting device configured to interrupt power transmission between a first rotating member and a second rotating member that are rotatable relative to each other on the same rotational axis, the power transmission interrupting device comprising:
   an interrupting member including engaging teeth that selectively engage with the second rotating member, and is movable in an axial direction between a coupling position at which the engaging teeth engage with the second rotating member and an uncoupling position at which the engaging teeth do not engage with the second rotating member; and
   a moving mechanism that moves the interrupting member in the axial direction, wherein:
   the moving mechanism includes an annular electromagnet including a coil winding that generates magnetic flux when current is applied thereto; a yoke constituting part of a magnetic path of the magnetic flux; a moving member, formed by a soft magnetic body, that constitutes the magnetic path of the magnetic flux with the yoke and moves in the axial direction; and a coupling member that couples the moving member with the interrupting member;
   the moving member has a cylindrical part facing an inner circumferential surface or an outer circumferential surface of the electromagnet, and an annular cover extending from one end of the cylindrical part in a radial direction and covering one of axial end faces of the electromagnet;
   the coupling member is connected between the moving member and the interrupting member; and
   when current is applied to the coil winding, the interrupting member moves in the axial direction by the coupling member as the moving member moves so that an interval between the annular cover and the one axial end face of the electromagnet changes.

2. The power transmission interrupting device according to claim 1, wherein the yoke has a cylindrical first yoke and an annular second yoke, the electromagnet being held in the radial direction between the first yoke and the cylindrical part of the moving member, the electromagnet being held in the axial direction between the second yoke and the annular cover of the moving member.

3. The power transmission interrupting device according to claim 2, wherein:
   a first space is formed between the annular cover of the moving member and the first yoke of the yoke, and a second space is formed between the cylindrical part of the moving member and the second yoke of the yoke; and
   one of the first space and the second space is a space in the radial direction of the electromagnet.

4. The power transmission interrupting device according to claim 3, wherein the other of the first space and the second space is a space in the axial direction of the electromagnet.

5. The power transmission interrupting device according to claim 1, wherein:
   the electromagnet has a molded resin part molded around the coil winding; and
   the moving member is supported so as to be movable in the axial direction in contact with the molded resin part.

6. The power transmission interrupting device according to claim 5, wherein the moving member is guided so as to be movable in the axial direction, with the cylindrical part in sliding contact with an outer circumferential surface of the molded resin part.

7. The power transmission interrupting device according to claim 5, wherein the moving member is guided so as to be movable in the axial direction, with the cylindrical part in sliding contact with an inner circumferential surface of the molded resin part.

8. The power transmission interrupting device according to claim 1, wherein the moving member is supported so as to be movable in the axial direction relative to the yoke while being restrained from rotating relative to the yoke.

9. The power transmission interrupting device according to claim 1, further comprising a sensor that outputs an electrical signal according to an axial position of the annular cover of the moving member.

10. The power transmission interrupting device according to claim 9, wherein the sensor has a contactor that elastically comes in contact with the annular cover of the moving member, a support that supports the contactor, and a switch that is turned on and off according to a shift of the contactor relative to the support.

11. A limited-slip differential comprising:
a first rotating member;
a second rotating member disposed so as to be rotatable relative to the first rotating member around a common rotational axis;
a third rotating member disposed so as to be rotatable relative to the first rotating member and the second rotating member around the common rotational axis;
an interrupting member including engaging teeth that selectively engage with the second rotating member, and is movable in an axial direction between a coupling position at which the engaging teeth engage with the second rotating member and an uncoupling position at which the engaging teeth do not engage with the second rotating member; and
a moving mechanism that moves the interrupting member in the axial direction, wherein:
as the first rotating member and the second rotating member are restrained from rotating relative to each other by the interrupting member, the third rotating member and the first and second rotating members are also restrained from rotating relative to each other;
the moving mechanism includes an annular electromagnet including a coil winding that generates magnetic flux when current is applied thereto; a yoke constituting part of a magnetic path of the magnetic flux; a moving member, formed by a soft magnetic body, that constitutes the magnetic path of the magnetic flux with the yoke and moves in the axial direction; and a coupling member that couples the moving member with the interrupting member;
the moving member has a cylindrical part facing an inner circumferential surface or an outer circumferential surface of the electromagnet, and an annular cover extending from one end of the cylindrical part in a radial direction and covering one of axial end faces of the electromagnet;
the coupling member is connected between the moving member and the interrupting member; and
when current is applied to the coil winding, the interrupting member moves in the axial direction by the coupling member as the moving member moves so that an interval between the annular cover and the one axial end face of the electromagnet changes.

12. The limited-slip differential according to claim 11, wherein the yoke is restrained from moving toward one axial side relative to the first rotating member as a second yoke butts against the first rotating member in the axial direction.

13. The limited-slip differential according to claim 11, wherein:
in a state where the engaging teeth of the interrupting member are not engaged with the second rotating member, power input into the first rotating member is allocated to the second rotating member and the third rotating member so as to allow for differential motion thereof;
as the engaging teeth of the interrupting member engage with the second rotating member, differential motion of the first rotating member and the second and third rotating members is limited;
the yoke is supported so as not to be movable in the axial direction relative to the first rotating member; and
the moving mechanism moves the interrupting member in the axial direction relative to the first rotating member.

* * * * *